US008063724B2

(12) United States Patent
Wang et al.

(10) Patent No.: US 8,063,724 B2
(45) Date of Patent: Nov. 22, 2011

(54) SELF-MATCHING BAND-PASS FILTER AND RELATED FREQUENCY DOWN CONVERTER

(75) Inventors: Che-Ming Wang, Taipei Hsien (TW); Wen-Tsai Tsai, Taipei Hsien (TW)

(73) Assignee: Wistron NeWeb Corporation, Hsi-Chih, Taipei Hsien (TW)

( * ) Notice: Subject to any disclaimer, the term of this patent is extended or adjusted under 35 U.S.C. 154(b) by 224 days.

(21) Appl. No.: 12/500,591

(22) Filed: Jul. 9, 2009

(65) Prior Publication Data

US 2010/0301970 A1 Dec. 2, 2010

(30) Foreign Application Priority Data

May 26, 2009 (TW) ............................... 98117514 A

(51) Int. Cl.
*H01P 1/203* (2006.01)
*H04B 1/16* (2006.01)

(52) U.S. Cl. ....................................... 333/204; 455/339

(58) Field of Classification Search .......... 333/202–205; 455/339

See application file for complete search history.

(56) References Cited

U.S. PATENT DOCUMENTS

| | | | | |
|---|---|---|---|---|
| 3,754,198 | A * | 8/1973 | Anghel | 333/204 |
| 5,187,459 | A * | 2/1993 | Russell et al. | 333/204 |
| 5,404,119 | A * | 4/1995 | Kim | 333/204 |
| 6,222,500 | B1 * | 4/2001 | Koitsalu et al. | 343/864 |
| 6,559,741 | B2 * | 5/2003 | Takeda | 333/204 |
| 6,642,816 | B2 * | 11/2003 | Tsujiguchi et al. | 333/204 |
| 2004/0246071 | A1 * | 12/2004 | Rottmoser et al. | 333/134 |

OTHER PUBLICATIONS

Cohn, "Parallel-Coupled Transmission-Line-Resonator Filters", IRE Trans. on Microwave Theory & Techniques, pp. 223-231, 1958.*

* cited by examiner

*Primary Examiner* — Seungsook Ham
(74) *Attorney, Agent, or Firm* — Winston Hsu; Scott Margo

(57) ABSTRACT

A band-pass filter includes an input port, an output port, and a plurality of resonators. The input port is utilized for receiving a radio frequency signal. The output port is utilized for outputting a filtered signal. The plurality of resonators are placed between the input port and the output port, and are utilized for band-pass filtering the radio frequency signal for generating the filtered signal, wherein the plurality of resonators comprise at least two different trace widths for matching the output impedance of the band-pass filter with the input impedance of a rear-stage circuit coupled to the output port.

26 Claims, 11 Drawing Sheets

SELF-MATCHING BAND-PASS FILTER AND RELATED FREQUENCY DOWN CONVERTER

BACKGROUND OF THE INVENTION

1. Field of the Invention

The present invention relates to a band-pass filter and related frequency down converter, and more particularly, to a self-matching band-pass filter and related frequency down converter.

2. Description of the Prior Art

A satellite communication system capable of wideband and coverage is widespread use in many areas, such as probe, military, telecommunication network, data communication, mobile communication, etc. A ground user of the satellite communication system requires a device consisting of an antenna, a low-noise block down-converter (LNB), and a demodulator for receiving a satellite signal. After the satellite signal is received by the antenna, the satellite signal is down converted to an intermediate frequency (IF) signal via the LNB, and finally demodulated to a transmitted signal via the demodulator for outputting into a user device, such as a television.

Please refer to FIG. 1, which is a functional block diagram of an LNB 10 according to the prior art. The LNB 10 includes a low noise amplifier 100, a band-pass filter 102, a matching circuit 104, a mixer 106, and a local oscillator 108. A radio frequency (RF) signal $V_{RF}$ is received by an antenna, and enters the LNB 10. Then, the RF signal $V_{RF}$ is amplified via the low noise amplifiers 100, and is filtered image frequency signal out via the band-pass filter 102 to generate a filtered signal $VF_{RF}$. Finally, the filtered signal $VF_{RF}$ is down converted to an IF band via the mixer 106 to output an IF signal $V_{IF}$. The band-pass filter 102 is a microstrip band-pass filter, which can be implemented by the following filters: a hairpin band-pass filter, an end-coupled band-pass filter, and a parallel-coupled band-pass filter as shown in FIG. 2A-2C.

Please refer to FIG. 2A, which is a schematic diagram of a hairpin band-pass filter 20 according to the prior art. The hairpin band-pass filter 20 includes an input port $PI_A$, an output port $PO_A$ and resonators $RN_{A\_1}$-$RN_{A\_n}$. The input port $PI_A$ and the output port $PO_A$ are respectively coupled to a front-stage circuit and a rear-stage circuit for receiving and outputting signals. Trace width W of each of the resonators $RN_{A\_1}$-$RN_{a\_n}$ is the same, and total length of each of the resonators $RN_{A\_1}$-$RN_{a\_n}$ is around half of a wavelength λ corresponding to a received signal. FIG. 2B is a schematic diagram of an end-coupled band-pass filter 22 according to the prior art. The end-coupled band-pass filter 22 includes an input port $PI_B$, an output port $PO_B$ and resonators $RN_{B\_1}$-$RN_{B\_n}$. The resonators $RN_{B\_1}$-$RN_{B\_n}$ are parallel lines and trace width W of each of the resonators $RNB_{\_1}$-$RN_{B\_n}$ is the same. In addition, length L of each of the resonators $RN_{B\_1}$ $RN_{B\_n}$ is λ/2. FIG. 2C is a schematic diagram of a parallel-coupled band-pass filter 24 according to the prior art. The parallel-coupled band-pass filter 24 includes an input port $PI_C$, an output port $PO_C$ and resonators $RN_{C\_1}$-$RN_{C\_n}$. The resonators $RN_{C\_1}$-$RN_{C\_n}$ are parallel lines and trace width W of each of the resonators $RN_{C\_1}$-$RN_{C\_n}$ is the same. In addition, length L of each of the resonators $RN_{C\_1}$-$RN_{C\_n}$ is λ/2, and adjacent resonators overlap for a length of λ/4. An amount of resonators of the abovementioned band-pass filters is related to filtering performance of the band-pass filters.

In order to cooperate a characteristic of a coaxial cable of a measurement instrument, an input impedance to an output impedance of the band-pass filter 102 are usually set to 50Ω: 50Ω. The mixer 106 is constructed by active elements, such as a field effect transistor or a bipolar junction transistor, whose input impedance is usually lower than the output impedance of the band-pass filter 102. The matching circuit 104 is used for controlling impedance match between the band-pass filter 102 and the mixer 106, so as to reduce the RF signal loss during transmission.

In the prior art, the rear-stage circuit elements are not particularly considered for the input and output impedance designs of the band-pass filter. Therefore, in the conventional LNB, the output port of the band-pass filter needs to be coupled to the matching circuit, and then performs impedance match with the rear-stage circuit. However, when the matching circuit exists, transmission line effect cannot be decreased to the lowest level and the loss of the RF signal outputted from the band-pass filter to the mixer cannot be improved effectively.

SUMMARY OF THE INVENTION

Therefore, the present invention provides a band-pass filter and related frequency down converter, wherein the output impedance of the band-pass filter is matched with the input impedance of a rear-stage circuit.

The present invention discloses a band-pass filter which includes an input port for receiving a radio frequency signal, an output port for outputting a filtered signal, and a plurality of resonators placed between the input port and the output port, for performing band pass filtering on the radio-frequency signal to generate the filtered signal. The plurality of resonators comprise at least two different trace widths for matching the output impedance of the band-pass filter with the input impedance of a rear-stage circuit coupled to the output port.

The present invention further discloses a band-pass filter which includes an input port for receiving a radio frequency signal, an output port for outputting a filtered signal, and a resonator placed between the input port and the output port, for performing band pass filtering on the radio-frequency signal to generate the filtered signal. Trace width of the resonator is different from trace width of the input port for matching the output impedance of the band-pass filter with the input impedance of a rear-stage circuit coupled to the output port.

The present invention discloses a down converter for a wireless communication receiver which includes a mixer and a band-pass filter. The mixer is utilized for downconverting the frequency of a filtered signal according to a local oscillating signal, for outputting an intermediate frequency signal. The band-pass filter is coupled to the mixer and includes an input port for receiving a radio frequency signal, an output port for outputting a filtered signal, and a plurality of resonators placed between the input port and the output port, for performing band-pass filtering on the radio frequency signal to generate the filtered signal. The plurality of resonators comprise at least two different trace widths for matching the output impedance of the band-pass filter with the input impedance of a rear-stage circuit coupled to the output port.

The present invention further discloses a down converter for a wireless communication receiver which includes a mixer and a band-pass filter. The mixer is utilized for downconverting the frequency of a filtered signal according to a local oscillating signal, for outputting an intermediate frequency signal. The band-pass filter is coupled to the mixer and includes an input port for receiving a radio frequency signal, an output port for outputting a filtered signal, and a resonator placed between the input port and the output port, for performing band pass filtering on the radio-frequency signal to generate the filtered signal, wherein trace width of the resonator is different from trace width of the input port for matching the output impedance of the band-pass filter with the input impedance of a rear-stage circuit coupled to the output port.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
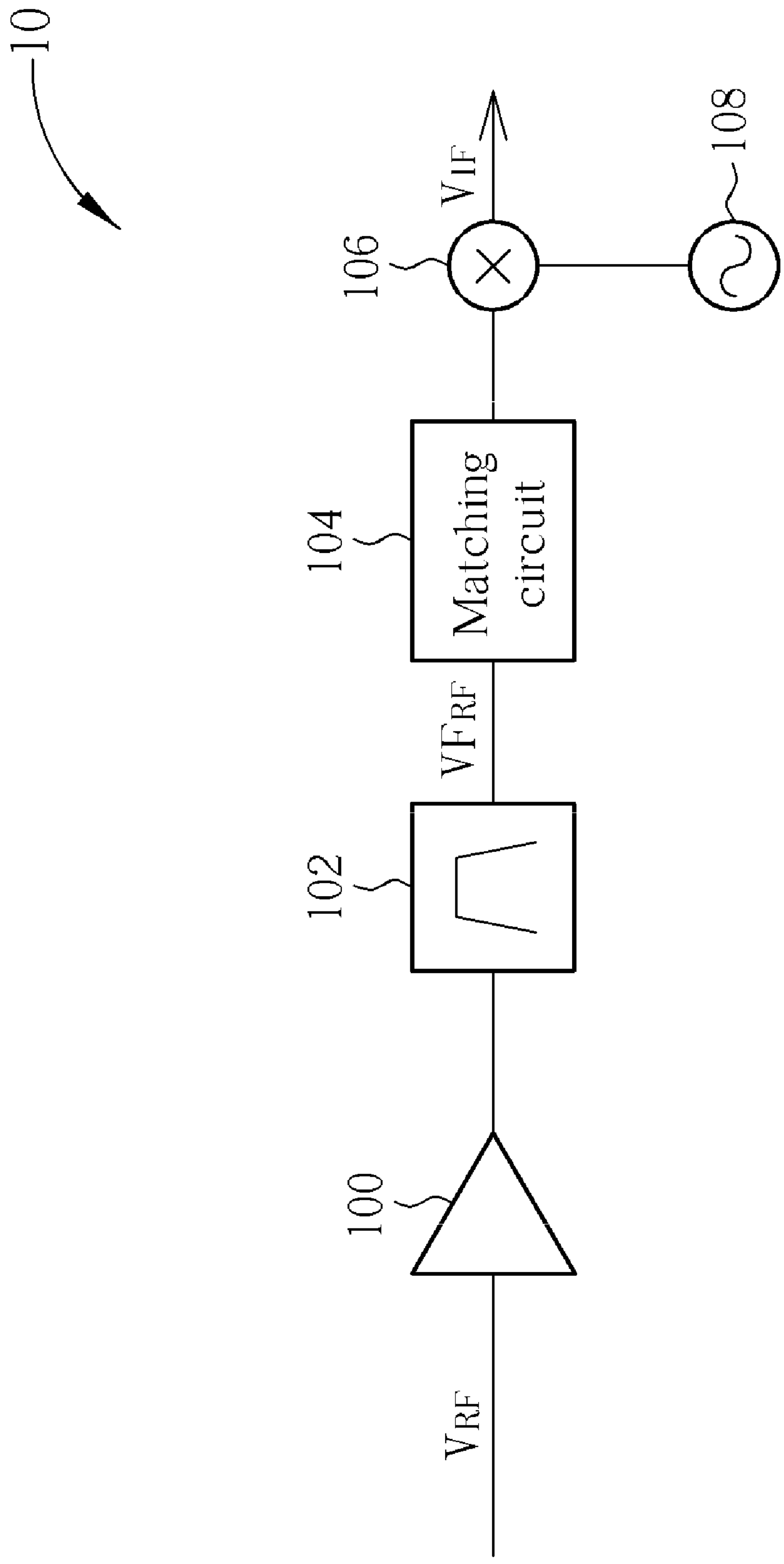
FIG. 1 PRIOR ART
FIG. 1 is a functional block diagram of a satellite frequency down converter according to the prior art.
Figure 2A:
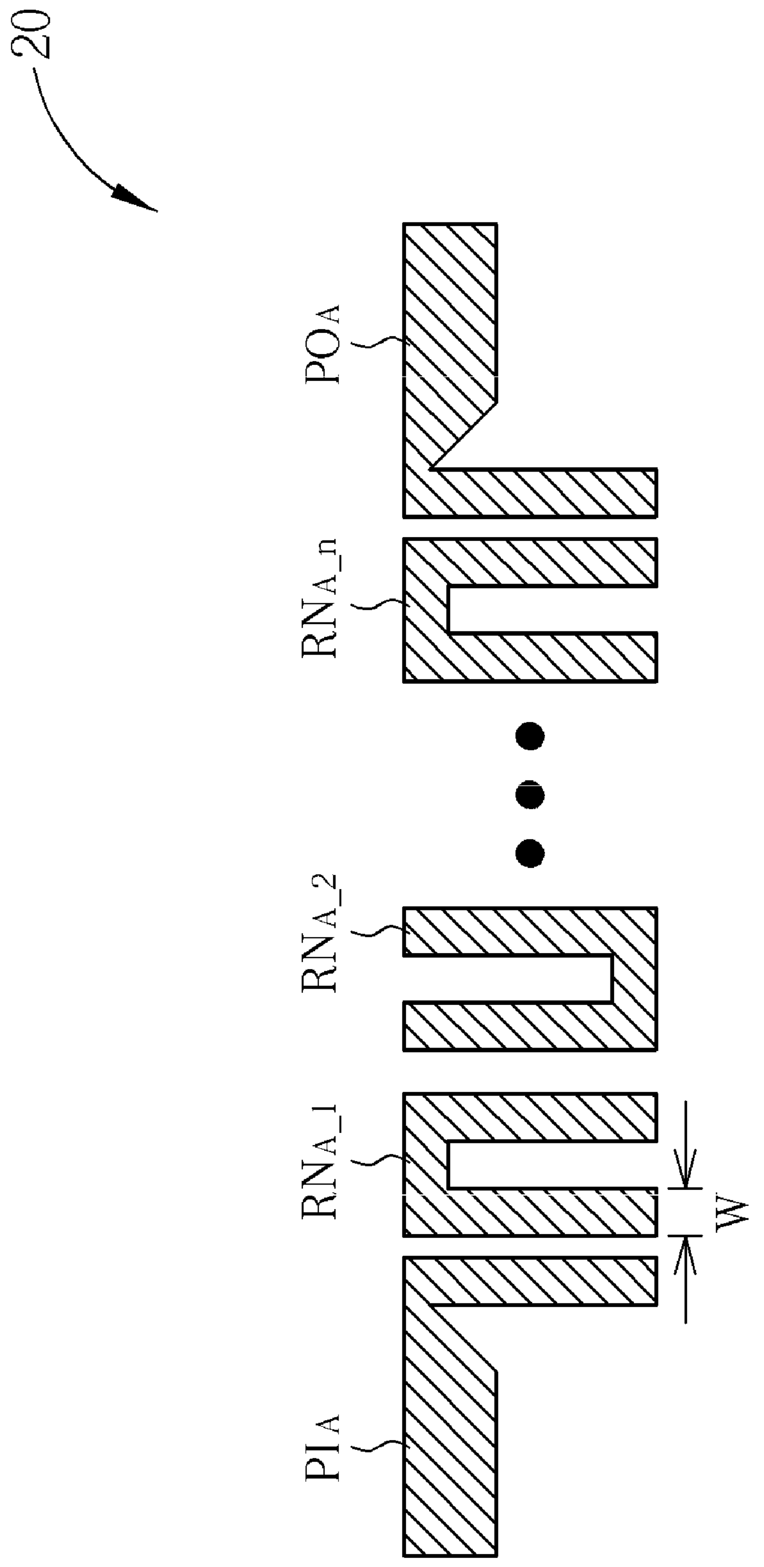
FIG. 2A PRIOR ART
FIG. 2A is a schematic diagram of a hairpin band-pass filter according to the prior art.
Figure 2B:
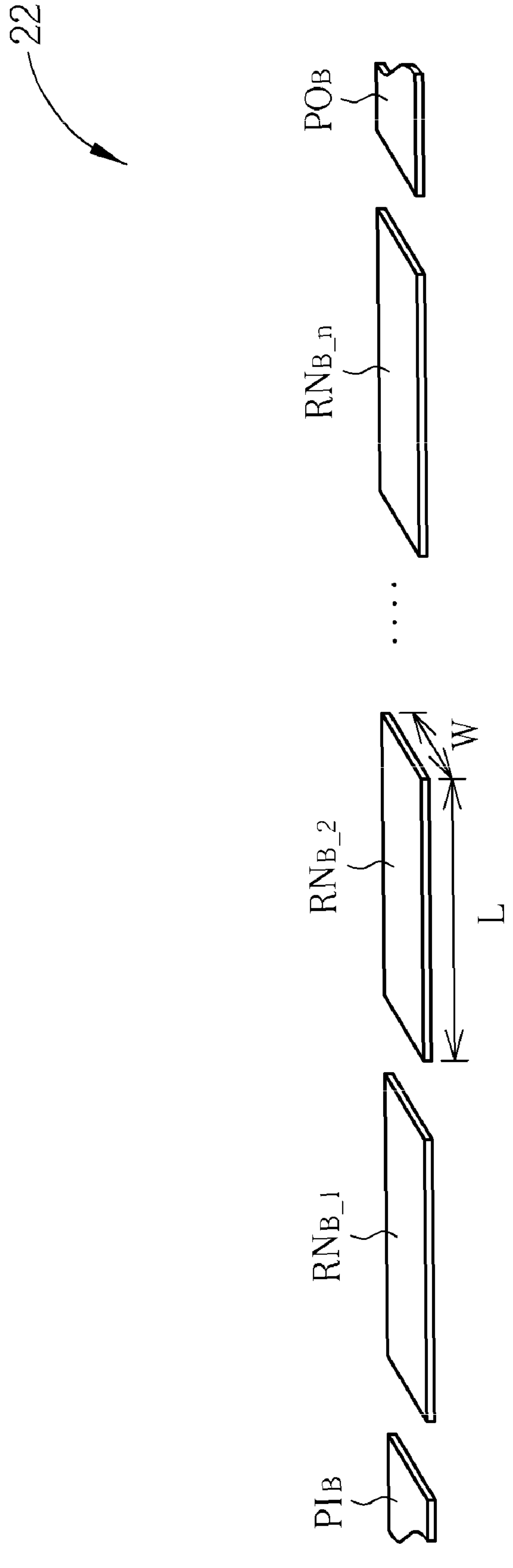
FIG. 2B PRIOR ART
FIG. 2B is a schematic diagram of an end-coupled band-pass filter according to the prior art.
Figure 2C:
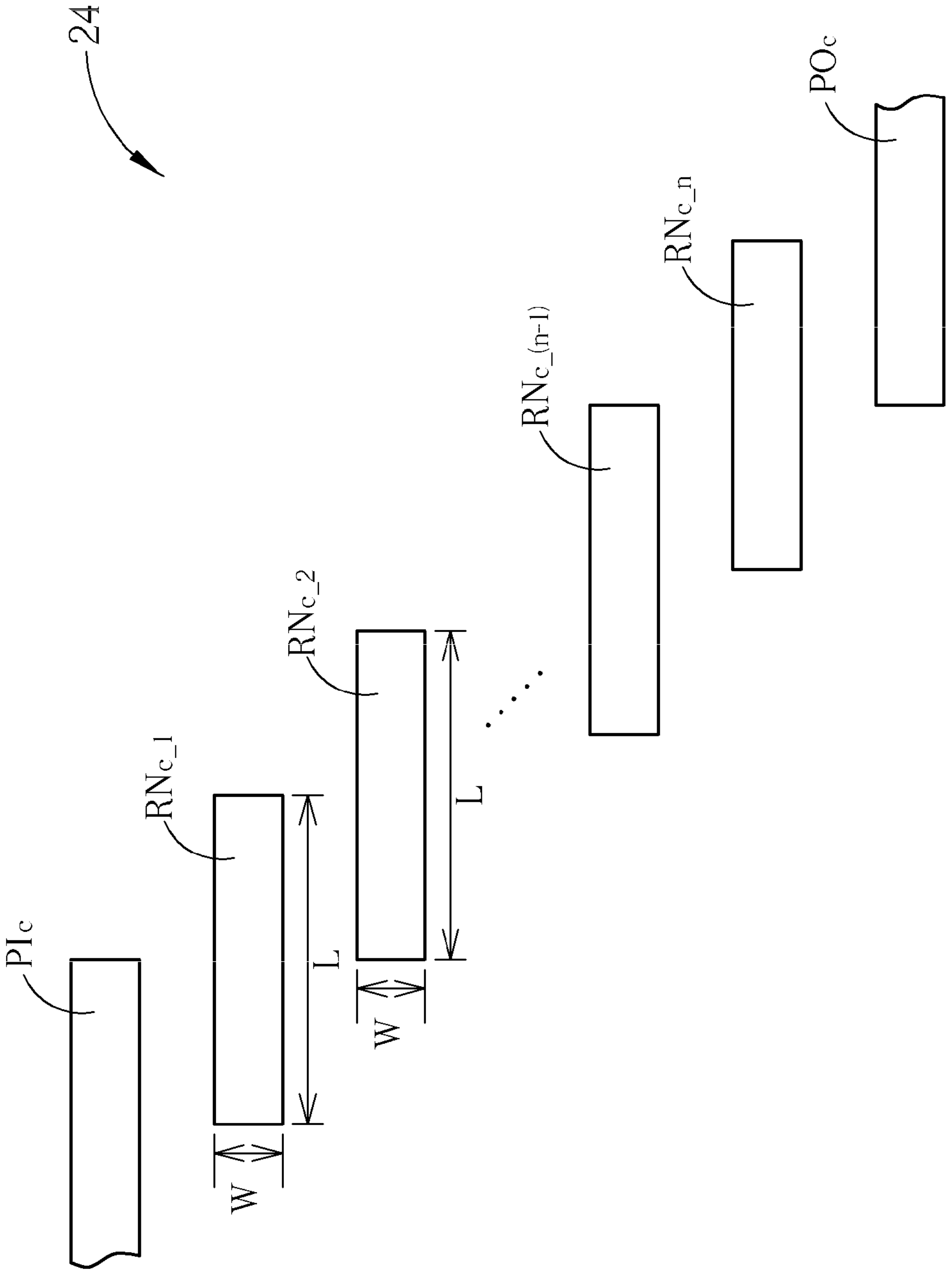
FIG. 2C PRIOR ART
FIG. 2C is a schematic diagram of a parallel-coupled band-pass filter according to the prior art.
Figure 3:
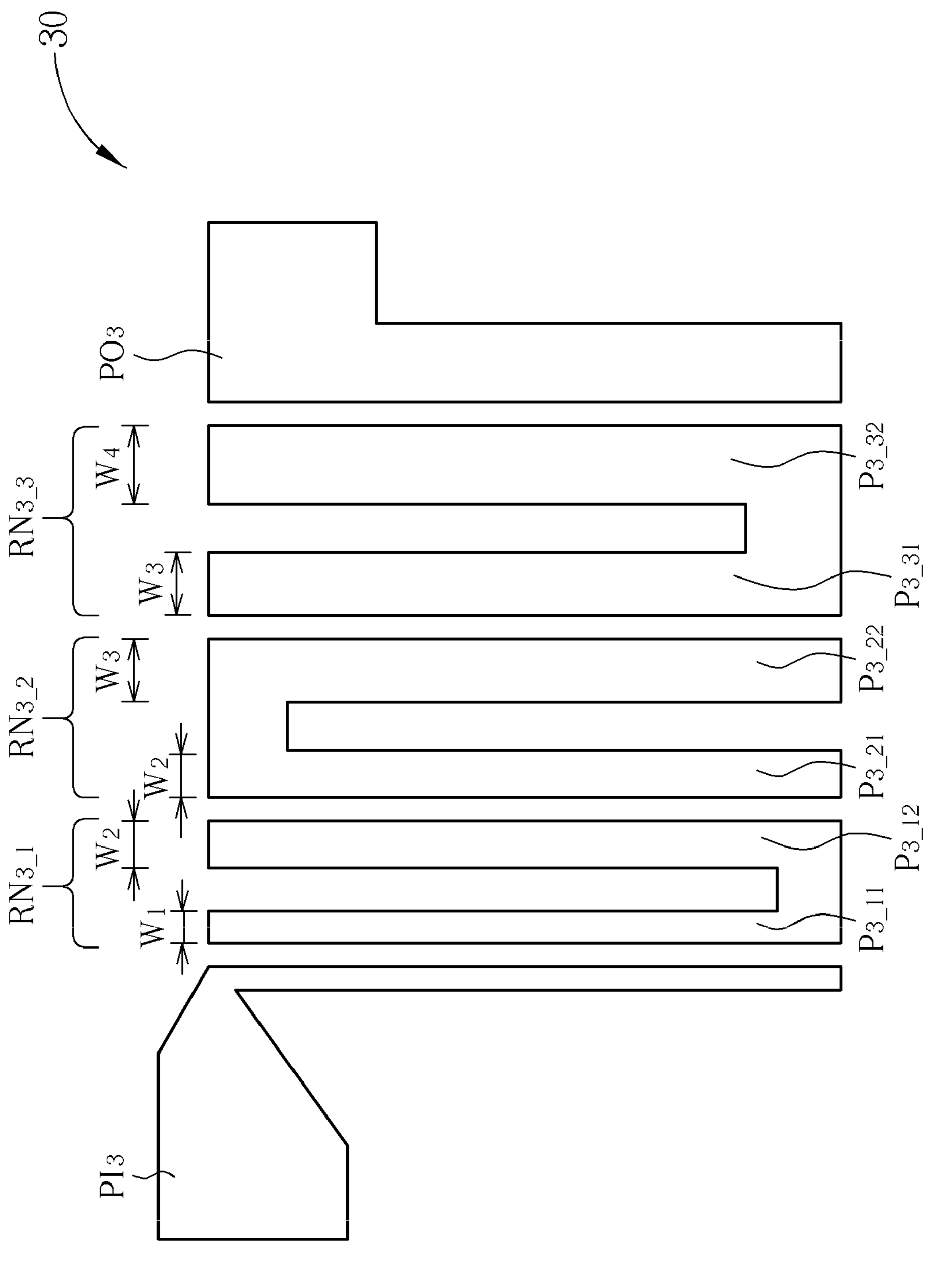
FIG. 3-FIG. 6 are schematic diagrams of band-pass filters according to embodiments of the present invention.

Please refer to FIG. 3, which is a schematic diagram of a band-pass filter 30 according to an embodiment of the present invention. The band-pass filter 30 is a hairpin microstrip band-pass filter, which includes an input port $PI_3$, an output port $PO_3$, and resonators $RN_{3\_1}$-$RN_{3\_3}$. The input port $PI_3$ is used for receiving an RF signal and the output port $PO_3$ is used for outputting a filtered signal. The resonators $RN_{3\_1}$-$RN_{3\_3}$ are U-shaped resonators and are placed between the input port $PI_3$ and the output port $PO_3$, which are arranged as $RN_{3\_1}$, $RN_{3\_2}$, and $RN_{3\_3}$ from the input port $PI_3$ in sequence, for filtering the RF signal and generating the filtered signal. Trace widths of the resonators $RN_{3\_1}$-$RN_{3\_3}$ are designed to match an output impedance of the band-pass filter 30 with an input impedance of a rear-stage circuit of the band-pass filter 30 in a condition of knowing the input impedance of the rear-stage circuit with the lowest noise.

The design of the band-pass filter 30 is illustrated as following. In FIG. 3, the input impedance of the rear-stage circuit is supposed lower than the input impedance of the band-pass filter 30. The closer to the output port $PO_3$, the larger trace widths of the resonators are, and thereby the trace widths are not the same, for matching the output impedance of the band-pass filter 30 with a lower input impedance of the rear-stage circuit. Each of the resonators $RN_{3\_1}$-$RN_{3\_3}$ includes two sections one closer to the input port $PI_3$ and another closer to the output port $PO_3$. The trace width of the section close to the output port $PO_3$ are larger than the trace width of the section close to the input port $PI_3$. A section $P_{3\_11}$ of the resonator $RN_{3\_1}$ is closer to the input port $PI_3$, and another section $P_{3\_12}$ is closer to the output port $PO_3$, where the trace width $W_2$ of the section $P_{3\_12}$ is larger than the trace width $W_1$ of the section $P_{3\_11}$. Similarly, the resonator $RN_{3\_2}$ includes two sections $P_{3\_21}$ and $P_{3\_22}$, and the trace width $W_3$ of the section $P_{3\_22}$ is larger than the trace width $W_2$ of the section $P_{3\_21}$. The resonator $RN_{3\_3}$ includes two sections $P_{3\_31}$ and $P_{3\_32}$, and the trace width $W_4$ of the section $P_{3\_32}$ is larger than the trace width $W_3$ of the section $P_{3\_31}$. In other word, the resonators $RN_{3\_1}$-$RN_{3\_3}$ have four different trace widths. Through gradually increased trace widths of the resonators $RN_{3\_1}$-$RN_{3\_3}$, the output impedance of the band-pass filter 30 can be matched with the lower input impedance of the rear-stage circuit.

Figure 4:
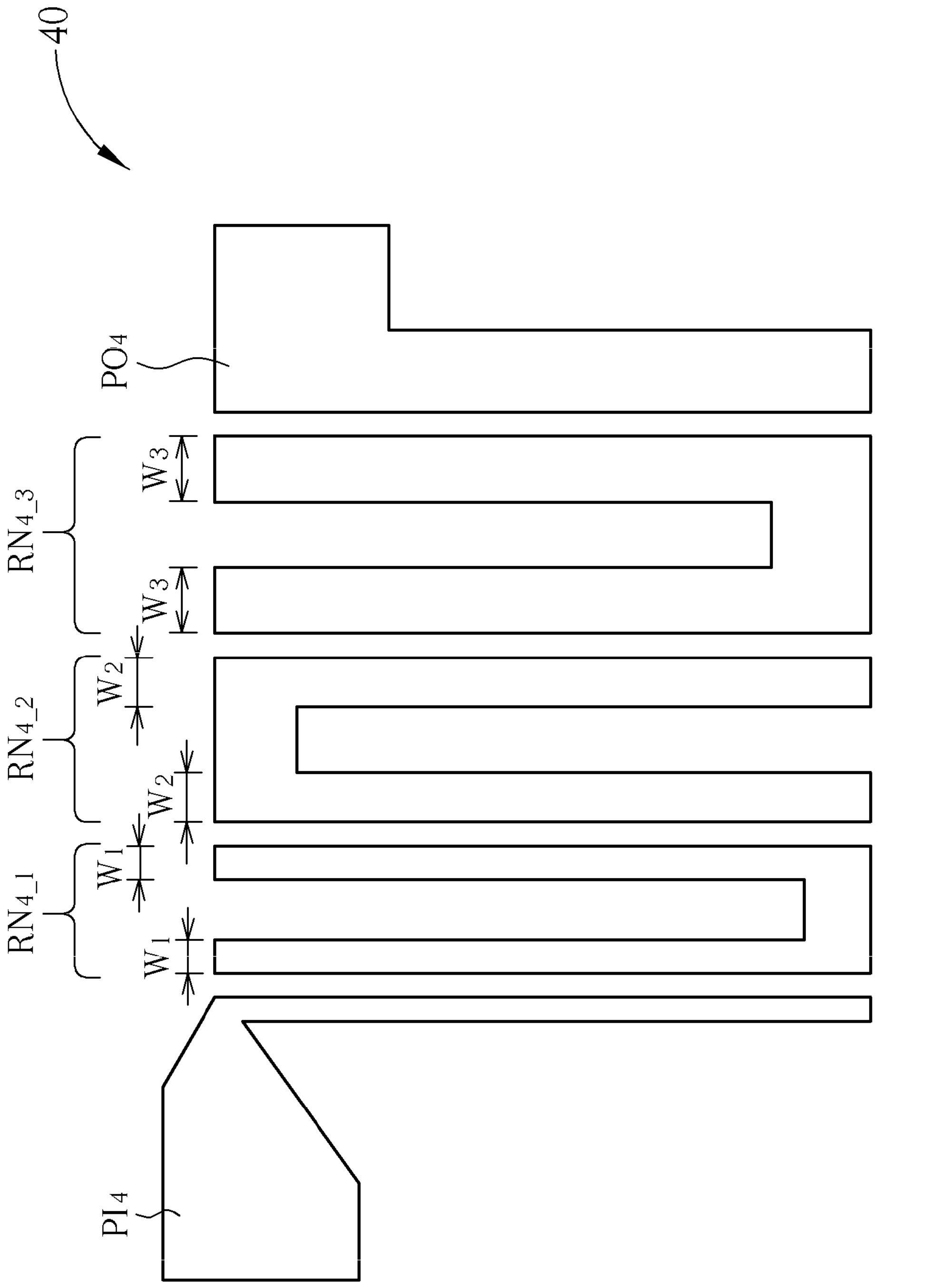

Please refer to FIG. 4, which is a schematic diagram of a band-pass filter 40 according to an embodiment of the present invention. The band-pass filter 40 is also the hairpin microstrip band-pass filter, which includes an input port $PI_4$, an output port $PO_4$, and resonators $RN_{4\_1}$-$RN_{4\_3}$. The input port $PI_4$ is used for receiving an RF signal and the output port $PO_4$ is used for outputting a filtered signal. The resonators $RN_{4\_1}$-$RN_{4\_3}$ is placed between the input port $PI_4$ and the output port $PO_4$, which are arranged as $RN_{4\_1}$, $RN_{4\_2}$, and $RN_{4\_3}$ from the input port $PI_4$ in sequence, for filtering the RF signal and generating the filtered signal. Similar to the band-pass filter 30 of FIG. 3, in the band-pass filter 40, the closer to the output port $PO_4$, the larger trace widths of the resonators are, which means the trace width $W_3$ of the resonator $RN_{4\_3}$ is larger than the trace width $W_2$ of the resonator $RN_{4\_2}$, and the trace width $W_2$ of the resonator $RN_{4\_2}$ is larger than the trace width $W_1$ of the resonator $RN_{4\_1}$. The difference is that each of the resonators $RN_{4\_1}$-$RN_{4\_3}$ has one trace width. In other words, in the band-pass filter 40, each resonator is not divided into sections with different trace widths, but with the same trace width.

As can be seen from above, the band-pass filter 30 and 40 both gradually increase the trace widths of the resonators for matching the output impedance with the lower input impedance of the rear-stage circuit. Similarly, the band-pass filters of the embodiments of the present invention can gradually decrease the trace widths of the resonators for matching the output impedance with a higher input impedance of the rear-stage circuit. The input impedance and output impedance of the band-pass filter in the prior art are symmetrical, so the trace width of each resonator is the same. In comparison, the present invention can make the output impedance of the band-pass filter dissymmetrical to the input impedance through gradually changed trace widths of the resonators, and matching with the input impedance of the rear-stage circuit, so as to economize on the matching circuit between the band-pass filter and the rear-stage circuit, and decrease the cost of the elements. Since the band-pass filter of the present invention has been matched with the rear-stage circuit, which can be called self-matching band-pass filter.

The difference between the band-pass filter 30 and 40 is that the band-pass filter 30 increases the trace width by a section of the resonator, and the band-pass filter 40 increases the trace width by a resonator. Please note that, in the embodiment of the present invention, the way of increasing the trace width by the resonator or the section of the resonator can be utilized in a band-pass filter at the same time, and can be utilized in some of the resonators according to the requirement. For example, a hairpin band-pass filter of the embodiment of the present invention includes three resonators divided into six sections $W_1$-$W_6$which indicates trace widths of each section from the input port to the output port, and a relationship between the trace widths of each section is $W_1<W_2<W_3<W_4<W_5<W_6$, which can match the output impedance of the band-pass filter with the lower input impedance of the rear-stage circuit also.

Note that, shapes of the input port or output port in FIGS. 3 and 4 are wide metal line connected to an upper point of a thin metal line which can be called a coupled line. In the embodiment of the present invention, the input port or output port of the hairpin band-pass filter connects to a position of the coupled line, such as a middle point or a lower point of the coupled line. In addition, in the hairpin band-pass filter of FIGS. 3 and 4, openings of U-shaped resonators are arranged in a way of reverse to each other. The way of opening arrangement is only an exemplary embodiment, and is not limited herein. The openings of two adjacent U-shaped resonators of the hairpin band-pass filter can be arranged in the same direction or reverse directions. In other words, the openings of all U-shaped resonators may be arranged in the same direction or reverse directions, or the openings of part adjacent U-shaped resonators are arranged in reverse directions. Shapes of the abovementioned input port and output port, and the opening directions of the U-shaped resonators can be freely designed, but the output impedance of the band-pass filter has to be matched with the input impedance of the rear-stage circuit.

Figure 5:
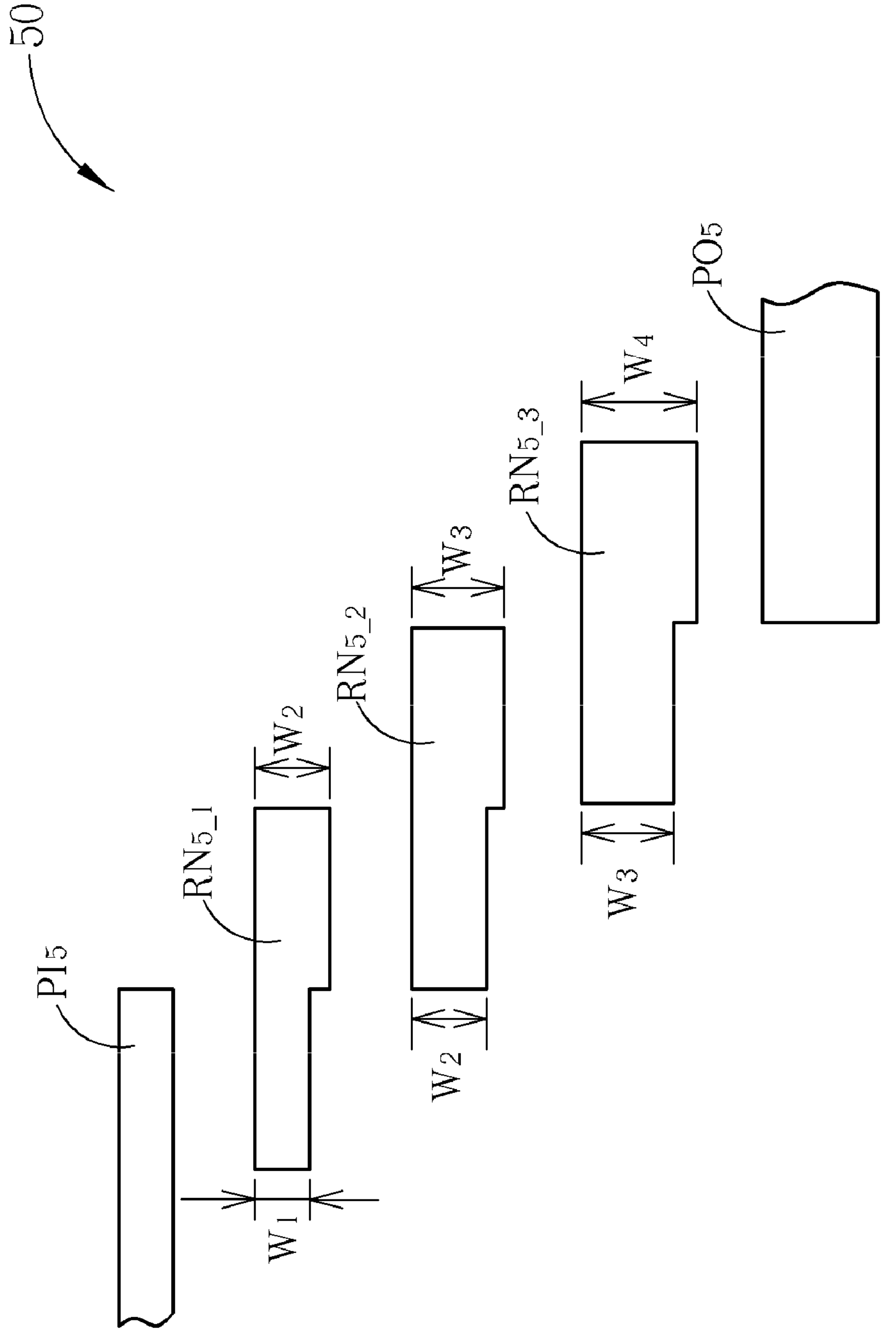

The gradual change trace width of the resonators is not only utilized in the hairpin band-pass filter, but also in two types of microstrip band-pass filter: parallel coupled band-pass filter and end-coupled band-pass filter. Please refer to FIG. 5, which is a schematic diagram of a band-pass filter 50 according to an embodiment of the present invention. The band-pass filter 50 is a parallel-coupled band-pass filter, which includes an input port $PI_5$, an output port $PO_5$, and resonators $RN_{5\_1}$-$RN_{5\_3}$. The operations of the input port $PI_5$, the output port $PO_5$, and the resonators $RN_{5\_1}$-$RN_{5\_3}$ are similar to elements of the abovementioned embodiment, so the detailed description is omitted herein. The resonators $RN_{5\_1}$-$RN_{5\_3}$ are placed between the input port $PI_5$ and the output port $PO_5$, which are arranged as $RN_{5\_1}$, $RN_{5\_2}$, and $RN_{5\_3}$ from the input port $PI_5$ in sequence. The resonators $RN_{5\_1}$-$RN_{5\_3}$ are parallel to each other, and traces of adjacent resonators overlap. The closer to the output port $PO_5$, the larger trace widths of the resonators are. Each of the resonators $RN_{5\_1}$-$RN_{5\_3}$ includes two sections one closer to the input port $PI_5$ and another closer to the output port $PO_5$. The trace width of the section closer to the output port $PO_5$ is larger than the trace width of the section closer to the input port $PI_5$. Each section of the resonators $RN_{5\_1}$-$RN_{5\_3}$ in FIG. 5 is not numerically assigned, and is marked with the width for clearly showing the gradual change width. The widths of each section of the resonators $RN_{5\_1}$-$RN_{5\_3}$ are $W_1$, $W_2$, $W_2$, $W_3$, $W_3$, and $W_4$ in sequence and a way of width change is similar to the way of the band-pass filter 30 of FIG. 3.

Figure 6:
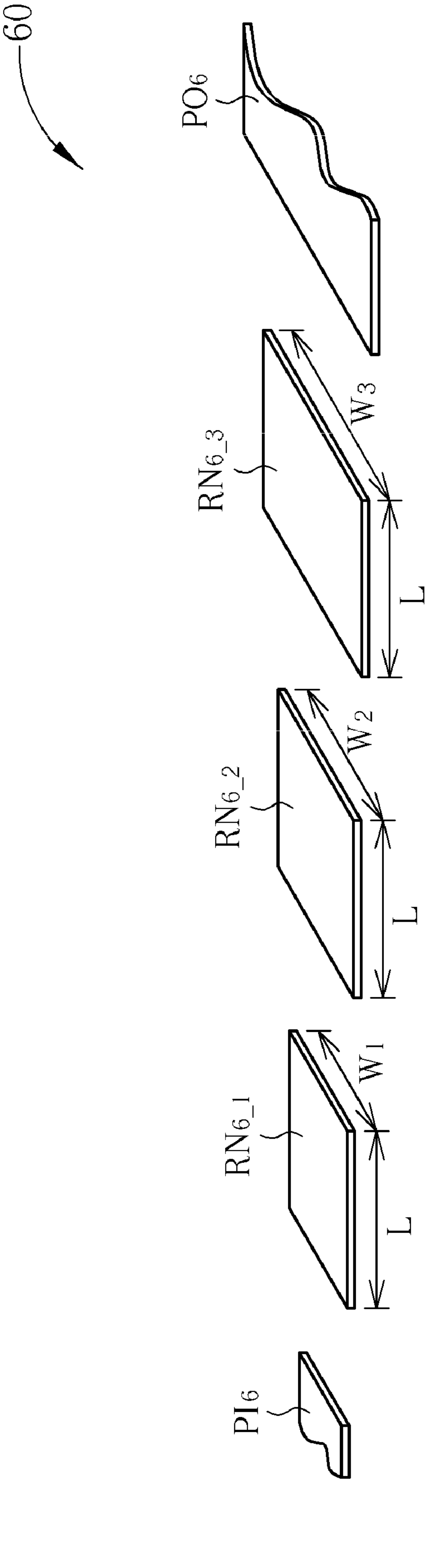

Please refer to FIG. 6, which is a schematic diagram of a band-pass filter 60 according to an embodiment of the present invention. The band-pass filter 60 is an end-coupled band-pass filter, which includes an input port $PI_6$, an output port $PO_6$, and resonators $RN_{6\_1}$-$RN_{6\_3}$. The operations of the input port PI6, the output port $PO_6$, and the resonators $RN_{6\_1}$-$RN_{6\_3}$ are similar to elements of the abovementioned embodiment, so the detailed description is omitted herein. The resonators $RN_{6\_1}$-$RN_{6\_3}$ are placed between the input port $PI_6$ and the output port $PO_6$, which are arranged as $RN_{6\_1}$, $RN_{6\_2}$, and $RN_{6\_3}$ from the input port $PI_6$ in sequence and parallel to each other. Trace length L of each of the resonators $RN_{6\_1}$-$RN_{6\_3}$ is the same, and the trace widths of each of the resonators $RN_{6\_1}$-$RN_{6\_3}$ are different. The relationship between the trace widths is $W_1<W_2<W_3$, and the closer to the output port $PO_6$, the larger trace widths of the resonators are.

The abovementioned band-pass filter 30, 40, 50, or 60 includes three resonators as an example. In practice, regardless of the hairpin, parallel-coupled or end-coupled band-pass filter, the present invention only needs at least a resonator for realizing a goal of adjusting the output impedance. For the end-coupled band-pass filter including a single resonator, the trace width of the resonator must be different from the trace width of the input port for adjusting the output impedance. For hairpin band-pass filter and parallel-coupled band-pass filter including a resonator, which realizes adjustment of the output impedance through two sections with different trace widths in a single resonator. On the other hand, the trace width of the single resonator is not divided into sections, and is different from the trace width of the input port for adjusting the output impedance. Take the hairpin band-pass filter 40 as an example, if the resonator $RN_{4\_1}$ is the only resonator, the trace width of resonator $RN_{4\_1}$ is different from the thin coupled line of the input port $PI_4$.

Figure 7:
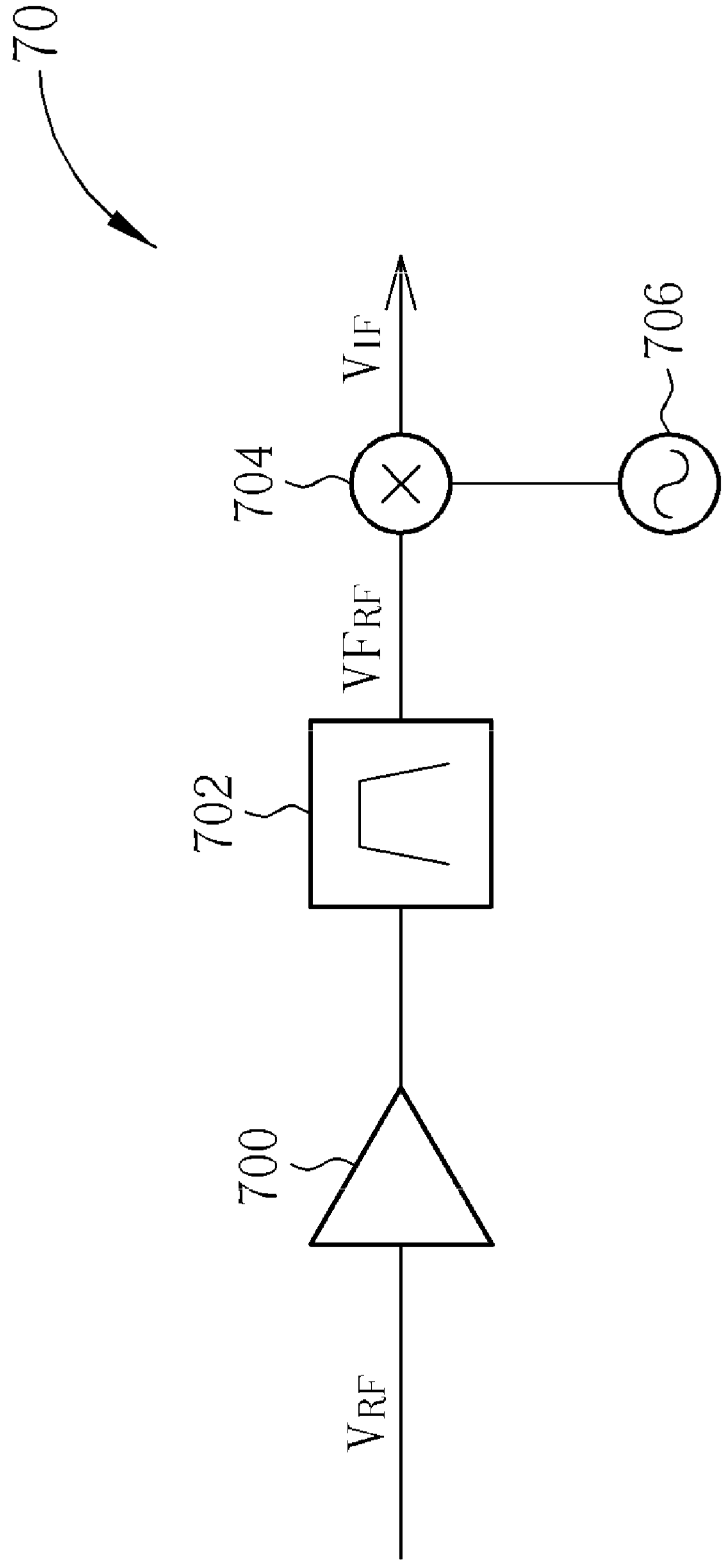
FIG. 7 is a functional block diagram of a low-noise block down converter according to an embodiment of the present invention.

The present invention further applies the abovementioned band-pass filters to a conventional low-noise block down converter (LNB) of a wireless communication receiver for reducing the matching circuit between the band-pass filter of the LNB and the rear-stage circuit. Please refer to FIG. 7, which is a functional block diagram of an LNB 70 according to an embodiment of the present invention. The LNB 70 includes a low noise amplifier 700, a band-pass filter 702, a mixer 704, and a local oscillator 706. The low noise amplifier 700 is used for amplifying an RF signal $V_{RF}$ received by an antenna. The band-pass filter 702 is coupled to the low noise amplifier 700, and is used for filtering an image frequency signal out of the RF signal $V_{RF}$ and then generating a filtered signal $VF_{RF}$. The band-pass filter 702 is one of the abovementioned band-pass filters 30, 40, 50, 60, or any other band-pass filter similar to embodiments of the present invention. For the mixer utilized in the LNB, the input impedance of the mixer is around 5Ω-20Ω in the lowest noise situation, which is far smaller than the input impedance 50Ω of the band-pass filter 702. The gradual increase trace width of the resonator in the band-pass filter 702 is designed according to the input impedance of the rear-stage mixer 704. The mixer 704 does not need to couple to the matching circuit and is directly coupled to the band-pass filter 702 and the local oscillator 706 for downconverting frequency of the filtered signal $VF_{RF}$ to intermediate frequency according a local oscillating signal generated by the local oscillator 706, and outputting an IF signal $V_{IF}$.

Figure 8:
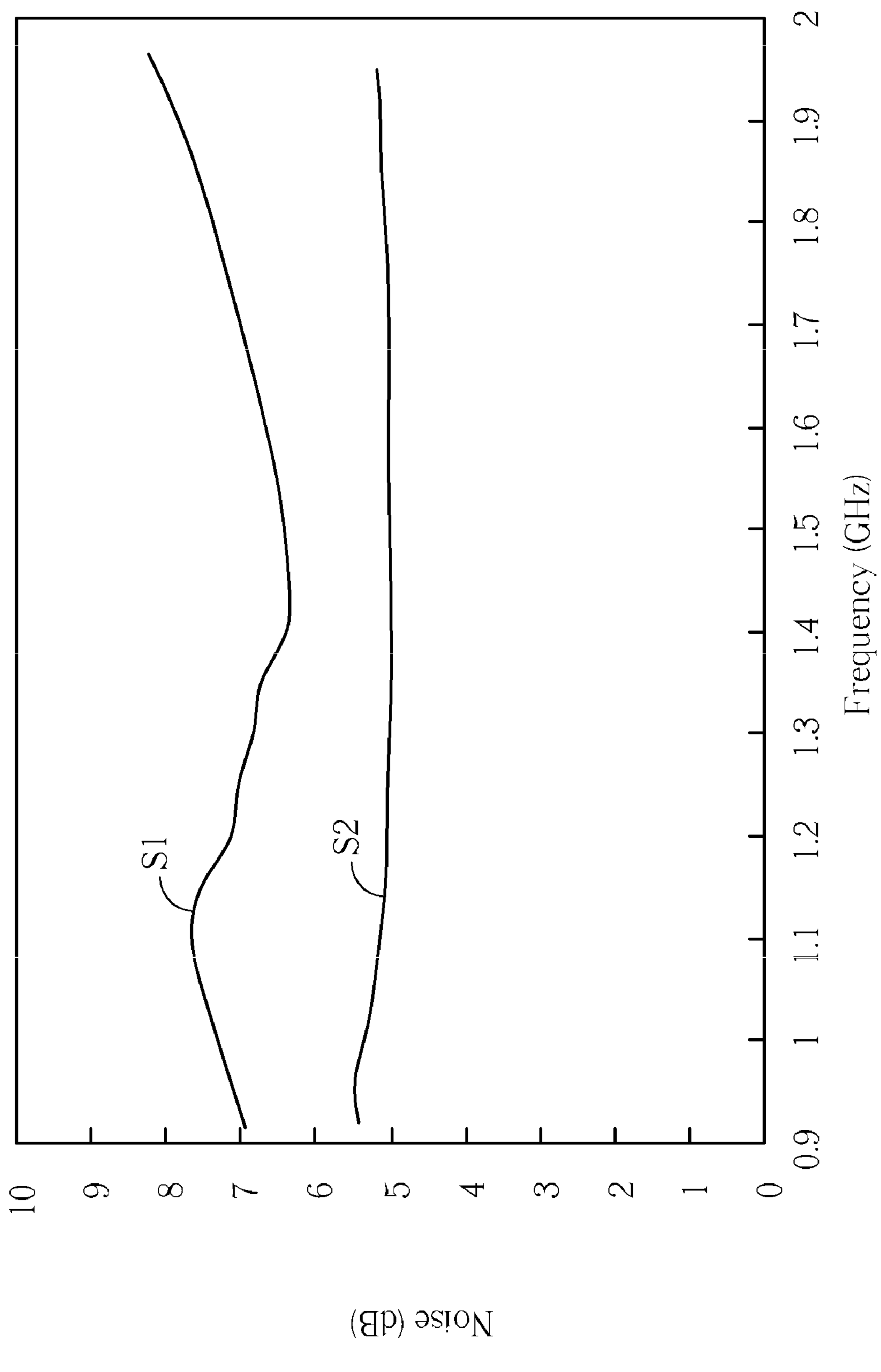
FIG. 8 is a noise characteristic graph of a mixer shown in FIG. 7.
Figure 9:
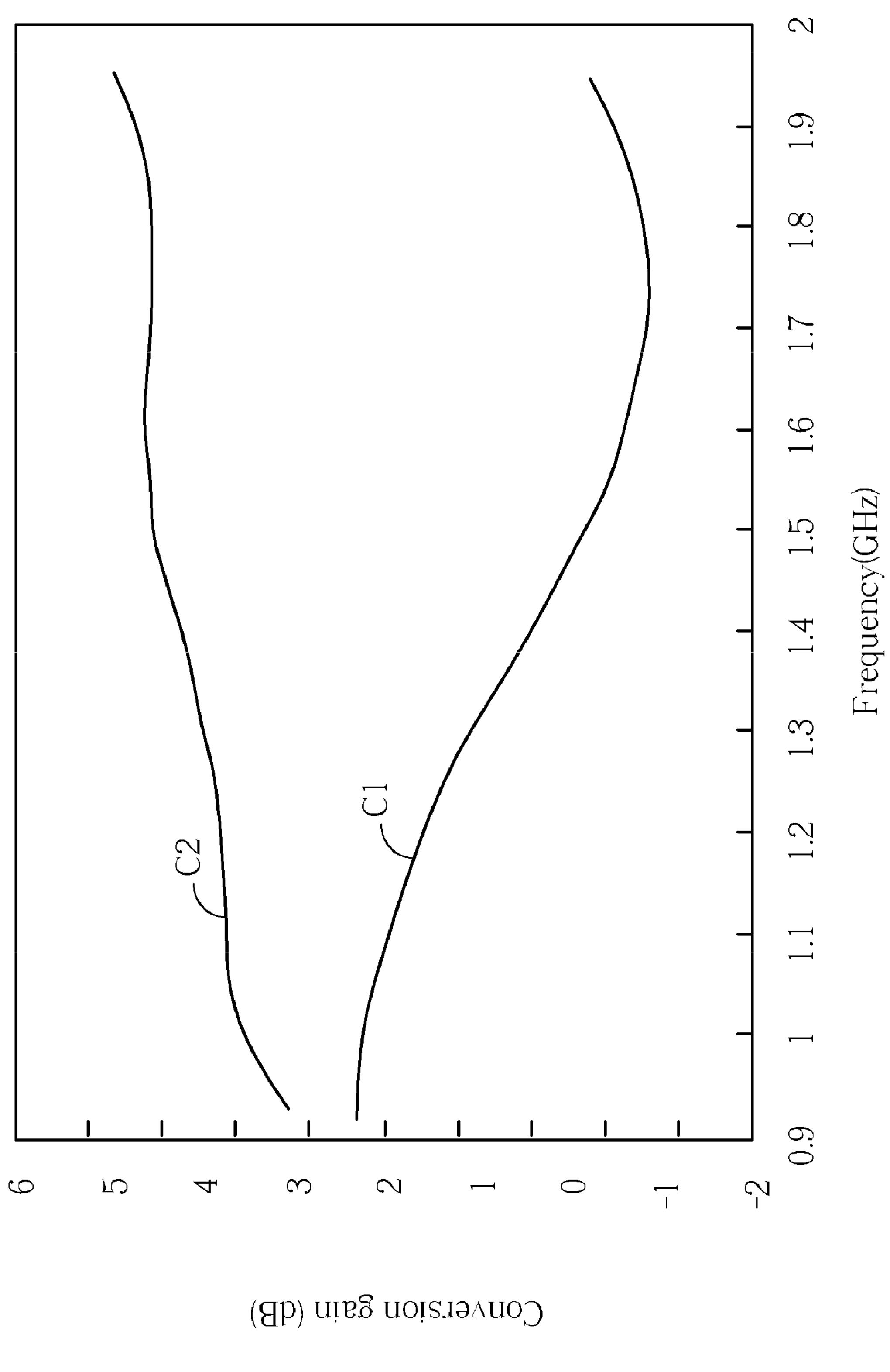
FIG. 9 is a conversion gain graph of a mixer shown in FIG. 7.

The LNB 70 is only an embodiment of the present invention, and the abovementioned band-pass filter can be utilized in other frequency down converter of the wireless communication receiver. Please note that, the filtered signal $VF_{RF}$ generated by the band-pass filter 702 is not affected by a transmission line effect of the external matching circuit to cause signal loss or noise interference. Therefore, noise characteristic and conversion gain of the mixer 704 is better than the mixer of the frequency down converter in the prior art. Please refer to FIG. 8, which is a noise characteristic graph of the mixer 704 of the LNB 70 shown in FIG. 7, where a curve SI is a noise characteristic curve of the mixer of the frequency down converter in the prior art, and a curve S2 is a noise characteristic curve of the mixer 704. An average of the curve S2 is 1-2 dB lower than the curve S1, and noise flatness of the curve S2 is also better than the curve S1. Please refer to FIG. 9, which is a conversion gain graph of the mixer 704 of the LNB 70 shown in FIG. 7, where a curve C1 is a conversion gain curve of the mixer of the frequency down converter in the prior art, and a curve C2 is a conversion gain curve of the mixer 704. As can be seen in FIG. 9, the conversion gain of the mixer 704 is increased substantially as a result of the characteristic of the band-pass filter 702 that self-matches the output impedance.

In conclusion, the present invention matches the output impedance of the band-pass filter with the input impedance of the rear-stage circuit by gradually changed trace widths of the resonators. Moreover, the band-pass filter of the present invention can be utilized in the frequency down converter for reducing the matching circuit, decreasing the cost, and enhancing the output characteristic of the rear-stage mixer.

Those skilled in the art will readily observe that numerous modifications and alterations of the device and method may be made while retaining the teachings of the invention.

What is claimed is:

1. A band-pass filter comprising:
an input port for receiving a radio frequency signal;
an output port for outputting a filtered signal; and
a plurality of resonators placed between the input port and the output port, for performing band-pass filtering on the radio frequency signal to generate the filtered signal, wherein the plurality of resonators comprise at least two different trace widths for matching the output impedance of the band-pass filter with the input impedance of a rear-stage circuit coupled to the output port;
wherein each of the plurality of resonators comprises a first section and a second section, the trace width of the first section is different from the trace width of the second section, and the trace width of the first section of the resonator closest to the output port is different from the trace width of the second section of the resonator closest to the input port.

2. The band-pass filter of claim 1, wherein the trace width of the first section is larger than the trace width of the second section.

3. The band-pass filter of claim 1, wherein the trace widths of two adjacent resonators of the plurality of resonators are different.

4. The band-pass filter of claim 1, wherein the trace width of one of the plurality of resonators closed to the output port is larger than the trace width of an adjacent resonator of the plurality of resonators closed to the input port.

5. The band-pass filter of claim 1, wherein the band-pass filter is a hairpin band-pass filter.

6. The band-pass filter of claim 5, wherein the band-pass filter comprises a plurality of U-shaped resonators, opening direction of one of the plurality of U-shaped resonators is different from opening direction of an adjacent U-shaped resonator of the plurality of U-shaped resonators.

7. The band-pass filter of claim 5, wherein the band-pass filter comprises a plurality of U-shaped resonators, opening direction of one of the plurality of U-shaped resonators is the same with opening direction of an adjacent U-shaped resonator of the plurality of U-shaped resonators.

8. The band-pass filter of claim 1, wherein the band-pass filter is a parallel-coupled band-pass filter.

9. The band-pass filter of claim 1, wherein the band-pass filter is an end-coupled band-pass filter.

10. A band-pass filter comprising:
an input port for receiving a radio frequency signal;
an output port for outputting a filtered signal; and
a resonator directly placed between the input port and the output port, for performing band-pass filtering on the radio-frequency signal to generate the filtered signal, wherein a trace width of the resonator is different from a trace width of the input port for matching the output impedance of the band-pass filter with the input impedance of a rear-stage circuit coupled to the output port.

11. The band-pass filter of claim 10, wherein the resonator comprises a first section closed to the input port and a second section closed to the output port, the trace width of the first section is different from the trace width of the input port and the trace width of the second section.

12. The band-pass filter of claim 11, wherein the band-pass filter is a hairpin band-pass filter or a parallel-coupled band-pass filter.

13. The band-pass filter of claim 10, wherein the band-pass filter is an end-coupled band-pass filter.

14. A down converter for a wireless communication receiver comprising:
a mixer for downconverting the frequency of a filtered signal according to a local oscillating signal, for outputting an intermediate frequency signal; and
a band-pass filter, coupled to the mixer, comprising:
an input port for receiving a radio frequency signal;
an output port for outputting a filtered signal; and
a plurality of resonators placed between the input port and the output port, for performing band-pass filtering on the radio frequency signal to generate the filtered signal, wherein the plurality of resonators comprise at least two different trace widths for matching the output impedance of the band-pass filter with the input impedance of a rear-stage circuit coupled to the output port;
wherein each of the plurality of resonators comprises a first section and a second section, the trace width of the first section is different from the trace width of the second section, and the trace width of the first section of the resonator closest to the output port is different from the trace width of the second section of the resonator closest to the input port.

15. The down converter of claim 14, wherein the trace width of the first section is larger than the trace width of the second section.

16. The down converter of claim 14, wherein the trace widths of two adjacent resonators of the plurality of resonators are different.

17. The down converter of claim 14, wherein the trace width of one of the plurality of resonators closed to the output port is larger than the trace width of an adjacent resonator of the plurality of resonators closed to the input port.

18. The down converter of claim 14, wherein the band-pass filter is a hairpin band-pass filter.

19. The down converter of claim 18, wherein the band-pass filter comprises a plurality of U-shaped resonators, opening direction of one of the plurality of U-shaped resonators is different from opening direction of an adjacent U-shaped resonator of the plurality of U-shaped resonators.

20. The down converter of claim 18, wherein the band-pass filter comprises a plurality of U-shaped resonators, opening direction of one of the plurality of U-shaped resonators is the same with opening direction of an adjacent U-shaped resonator of the plurality of U-shaped resonators.

21. The down converter of claim 14, wherein the band-pass filter is a parallel-coupled band-pass filter.

22. The down converter of claim 14, wherein the band-pass filter is an end-coupled band-pass filter.

23. A down converter for a wireless communication receiver comprising:
a mixer for downconverting the frequency of a filtered signal according to a local oscillating signal, for outputting an intermediate frequency signal; and
a band-pass filter, coupled to the mixer, comprising:
an input port for receiving a radio frequency signal;
an output port for outputting a filtered signal; and
a resonator directly placed between the input port and the output port, for performing band-pass filtering on the radio frequency signal to generate the filtered signal, wherein a trace width of the resonator is different from a trace width of the input port for matching the output impedance of the band-pass filter with the input impedance of a rear-stage circuit coupled to the output port.

24. The down converter of claim 23, wherein the resonator comprises a first section closed to the input port and a second section closed to the output port, the trace width of the first section is different from the trace width of the input port and the trace width of the second section.

25. The down converter of claim 24, wherein the band-pass filter is a hairpin band-pass filter or a parallel-coupled band-pass filter.

26. The down converter of claim 23, wherein the band-pass filter is an end-coupled band-pass filter.

* * * * *